United States Patent
Gui et al.

(10) Patent No.: US 11,620,492 B2
(45) Date of Patent: Apr. 4, 2023

(54) FLEXIBLE EDGE-EMPOWERED GRAPH CONVOLUTIONAL NETWORKS WITH NODE-EDGE ENHANCEMENT

(71) Applicant: NEC Laboratories America, Inc., Princeton, NJ (US)

(72) Inventors: Jiaping Gui, West Windsor Township, NJ (US); Zhengzhang Chen, Princeton Junction, NJ (US); Junghwan Rhee, Princeton, NJ (US); Haifeng Chen, West Windsor, NJ (US); Pengyang Wang, Rolla, MO (US)

(73) Assignee: NEC Corporation, Tokyo (JP)

( * ) Notice: Subject to any disclaimer, the term of this patent is extended or adjusted under 35 U.S.C. 154(b) by 334 days.

(21) Appl. No.: 16/998,280

(22) Filed: Aug. 20, 2020

(65) Prior Publication Data

US 2021/0064959 A1   Mar. 4, 2021

Related U.S. Application Data

(60) Provisional application No. 62/892,070, filed on Aug. 27, 2019, provisional application No. 62/909,847, filed on Oct. 3, 2019.

(51) Int. Cl.
*G06N 3/04* (2006.01)
(52) U.S. Cl.
CPC .................................. *G06N 3/04* (2013.01)
(58) Field of Classification Search
CPC ............................................... G06N 3/04–088
See application file for complete search history.

(56) References Cited

U.S. PATENT DOCUMENTS

| | | | |
|---|---|---|---|
| 2018/0253647 A1* | 9/2018 | Yu | G06N 3/04 |
| 2018/0276485 A1* | 9/2018 | Heck | G01C 21/3461 |
| 2020/0258381 A1* | 8/2020 | Fowe | G08G 1/052 |

FOREIGN PATENT DOCUMENTS

EP    2466532 A1 *  6/2012  ............. G06N 3/006

OTHER PUBLICATIONS

Arsov et al., "Network Embedding: An Overview", http://arxiv.org/abs/1911.11726v1[cs.LG], Nov. 2019, 10 pages.
(Continued)

*Primary Examiner* — Stephen G Sherman
(74) *Attorney, Agent, or Firm* — Joseph Kolodka (57) ABSTRACT

Systems and methods for predicting road conditions and traffic volume is provided. The method includes generating a graph of one or more road regions including a plurality of road intersections and a plurality of road segments, wherein the road intersections are represented as nodes and the road segments are represented as edges. The method can also include embedding the nodes from the graph into a node space, translating the edges of the graph into nodes of a line graph, and embedding the nodes of the line graph into the node space. The method can also include aligning the nodes from the line graph with the nodes from the graph, and optimizing the alignment, outputting a set of node and edge representations that predicts the traffic flow for each of the road segments and road intersections based on the optimized alignment of the nodes.

20 Claims, 8 Drawing Sheets

(56) References Cited

OTHER PUBLICATIONS

Kim et al., "Modeling Social Networks with Node Attributes using the Multiplicative Attribute Graph Model", Conference: UAI 2011, Proceedings of the Twenty-Seventh Conference on Uncertainty in Artificial Intelligence, Jul. 2011, 15 pages.

Kipf et al., "Semi-Supervised Classification with Graph Convolutional Networks", arXiv:1609.02907v4 [cs.LG] Feb. 22, 2017, pp. 1-14.

Wu et al., "A Comprehensive Survey on Graph Neural Networks", arXiv:1901.00596v4 [cs.LG] Dec. 4, 2019, pp. 1-22.

Battaglia et al., "Relational Inductive Biases, Deep Learning, and Graph Networks", arXiv:1806.01261v3 [cs.LG] Oct. 17, 2018, pp. 1-40.

Bruna et al., "Spectral Networks and Deep Locally Connected Networks on Graphs", arXiv:1312.6203v3 [cs.LG] May 21, 2014, pp. 1-14.

Dai et al., "Learning Steady-States of Iterative Algorithms over Graphs", Proceedings of the 35th International Conference on Machine Learning, Jul. 2018, 9 pages.

Defferrard et al., "Convolutional Neural Networks on Graphs with Fast Localized Spectral Filtering", 30th Conference on Neural Information Processing Systems (NIPS 2016), Dec. 2016, pp. 1-9.

Gilmer et al., "Neural Message Passing for Quantum Chemistry", arXiv:1704.01212v2 [cs.LG] Jun. 12, 2017, 14 pages.

Hamilton et al., "Inductive Representation Learning on Large Graphs", 31st Conference on Neural Information Processing Systems (NIPS 2017), Dec. 2017, pp. 1-11.

Li et al., "Gated Graph Sequence Neural Networks", arXiv:1511.05493v4 [cs.LG] Sep. 22, 2017, pp. 1-20.

Scarselli et al., "The Graph Neural Network Model", IEEE Transactions on Neural Networks, Jan. 2009, vol. 20, No. 1, p. 61-80.

Li et al., "Adaptive Graph Convolutional Neural Networks", arXiv:1801.03226v1 [cs.LG] Jan. 10, 2018, 8 pages.

\* cited by examiner

FLEXIBLE EDGE-EMPOWERED GRAPH CONVOLUTIONAL NETWORKS WITH NODE-EDGE ENHANCEMENT

RELATED APPLICATION INFORMATION

This application claims priority to Provisional Application No. 62/892,070, filed on Aug. 27, 2019, incorporated herein by reference in its entirety, and Provisional Application No. 62/909,847, filed on Oct. 3, 2019, incorporated herein by reference in its entirety.

BACKGROUND

Technical Field

The present invention relates to graph convolutional networks (GCN) and more particularly edge-empowered graph convolutional networks (EE-GCN).

Description of the Related Art

Graphs can provide a data structure for describing relationships between entities represented as nodes. Analyzing graph-structured data can help with understanding the nature of entities and relationships between them.

Graph convolutional network (GCN) methods can model graph structured data and learn a node representation by aggregating the representations of neighboring nodes. GCNs approaches may fall within two main categories, spectral-based and spatial-based. In addition, recurrent-based methods can update hidden representations on the same graph convolution layer, while composition-based methods can achieve it on a different graph convolution layer. Spectral-based Node embedding with GCN, however, can isolate the nodes from edges and lose information about or contained in the edges. Most of these methods only consider information from neighboring nodes, while ignoring edge information. Since GCN cannot model edges well, these methods cannot provide a holistic view of graphs.

SUMMARY

According to an aspect of the present invention, a method is provided for predicting road conditions and traffic volume. The method includes generating a graph of one or more road regions, wherein each road region includes a plurality of road intersections and a plurality of road segments, and wherein the road intersections are represented as nodes in the graph and the road segments are represented as edges in the graph. The method can also include embedding the nodes from the graph into a node space, translating the edges of the graph into nodes of a line graph, and embedding the nodes of the line graph into the node space. The method can also include aligning the nodes from the line graph with the nodes from the graph using a learned mapping matrix, and optimizing the alignment by utilizing a regularization term in a final loss function. The method can also include outputting a set of node and edge representations that predicts the traffic flow for each of the road segments and road intersections of the graph based on the optimized alignment of the nodes from the line graph with the nodes from the graph.

According to another aspect of the present invention, a system is provided for predicting road conditions and traffic volume. The system includes a computer system with memory configured to store a graph of one or more road regions, wherein each road region includes a plurality of road intersections and a plurality of road segments, and wherein the road intersections are represented as nodes in the graph and the road segments are represented as edges in the graph. The system also includes one or more processor devices and an operating system. The system also includes a convertor configured to translate the edges of the graph into nodes of a line graph; an embedder configured to embed the nodes from the graph into a node space and embed the nodes of the line graph into the node space; an enhancer configured to align the nodes from the line graph with the nodes from the graph using a learned mapping matrix, and optimize the alignment by utilizing a regularization term in a final loss function; and a predictor configured to output a set of node and edge representations that predicts the traffic flow for each of the road segments and road intersections of the graph based on the optimized alignment of the nodes from the line graph with the nodes from the graph.

According to another aspect of the present invention, a non-transitory computer readable storage medium with a computer readable program for predicting road conditions and traffic volume is provided. The computer readable program can causes the computer to perform generating a graph of one or more road regions, wherein each road region includes a plurality of road intersections and a plurality of road segments, and wherein the road intersections are represented as nodes in the graph and the road segments are represented as edges in the graph. The program can also perform embedding the nodes from the graph into a node space, translating the edges of the graph into nodes of a line graph, and embedding the nodes of the line graph into the node space. The program can also perform aligning the nodes from the line graph with the nodes from the graph using a learned mapping matrix, and optimizing the alignment by utilizing a regularization term in a final loss function. The program can also perform outputting a set of node and edge representations that predicts the traffic flow for each of the road segments and road intersections of the graph based on the optimized alignment of the nodes from the line graph with the nodes from the graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for incorporating edge information into learning representations for flexible edge-empowered framework for Graph Convolutional Networks (GCNs) with node-edge enhancement. In various embodiments, undirected graphs with both node attributes and edge attributes are considered. The attributed graphs can be represented as $G=(V, E, X_V, X_E)$, where G denotes the graph, V denotes the set of nodes, v, E denotes the set of edges, e, $X_V$ denotes the set of node attributes, $x_v$, and $X_E$ denotes the set of edge attributes, $x_E$. Edges can contain unique and/or important information for graph-based learning, but in some cases, edge attributes may be partially unavailable. Many Graph Convolutional Networks, however, ignore edge information (e.g., edge attributes), and current GCNs are not able to model edge information when edge attributes are not available or partially available. Using the described process, the node embedding and edge embedding can be enhanced by each other, where node embedding and edge embedding can be jointly modeled.

In various embodiments of the present invention, edge attributes can be incorporated into node embeddings, even when edge attributes are not available or partially available. Both node embedding and edge embedding may be learned jointly in the proposed GCNs when edge attributes are available, edge attributes are not available, or when edge attributes are partially available. Under the first condition, edge attributes may be used to initialize the edge embedding. When edge attributes are not available or partially available, initialization of edge embedding may be done utilizing a line-graph approach. Node and edge embeddings are learned features from nodes and edges, respectively.

In various embodiments, a line graph-based method can be used to initialize the edge embedding. An original graph, G, can be converted into Line Graph, L(G), and a node embedding method (e.g., DeepWalk) can be applied to learn the node embedding of L(G). Deep learning methods can be sensitive to the initialization, so learned embedding using the line graph-based method can be used to initialize the edge embedding, rather than randomization.

Various embodiments relate to the improvement to traffic management using embedding a combination of edge and node attributes, including improving traffic flow and road repair management through traffic analysis. Traffic patterns may be predicted using a graph representation with road intersections as nodes and road characteristics between intersections represented as edges.

Various embodiments of the present invention do not utilize or apply to spectral convolution neural networks (Spectral CNN), where the Spectral CNN may consider filters as a set of learnable parameters and graph signals of multi-dimension.

Various embodiments of the present invention do not utilize or apply to ChebNet which defines a filter as Chebyshev polynomials of diagonal matrix of eigenvalues, or first order approximations of ChebNet.

Various embodiments of the present invention do not adopt the randomization method for the initialization.

After obtaining node embedding and edge embedding, both embeddings can be combined as the input to GCNs; however, they cannot be directly combined, since node features and edge feature are not in the same feature space, which means node features and edge features are not aligned for direct learning. Node and edge embeddings, however, can be learned jointly and combined, where the model simultaneously learns and updates node and edge embeddings. This can be through modeling the interactions and mutual enhancement between node and edge embeddings.

In various embodiments, a mapping function can be designed and employed to convert edge feature space into node feature space. The proposed framework enables GCNs to incorporate edge information, and thus can be plugged into all current spatial-based GCN variants.

A graph $G=(V, E)$ is a set of nodes $V=\{v_1, v_2, \ldots, v_n\}$, and a set of edges $E=\{e_{ij}|1 \le i,j \le n\}$. X can be a feature set, and $x_i$ can be attributes. $X=\{x_1, x_2, \ldots, x_n\}$. For example, $x_v$ and $x_E$ can denote the attributes of nodes and edges in the original space.

In various embodiments, for a triplet (i.e., two nodes and the one edge that connects them), the summation of a node and edge embedding, can be equal to that of the other node and edge embedding. A mapping matrix that maps the edge embedding into the node embedding space can be learned, so as to minimize a mapping loss. The mapping loss can be added as the regularization term in a final loss function. This can achieve joint optimization. The mapping function can be given by: $f: x_v \to h_v, x_E \to h_E$. In this formula, $x_v$ and $x_E$ denote the attributes of nodes and edges in the original space, respectively, while $h_v$ and $h_E$ denote the attributes of nodes and edges in the mapped space.

In various embodiments, three meta-interactions can be utilized to model the interactions among nodes and edges. The three meta-interactions can include: nodes to edges, edges to nodes, and nodes to nodes. The interactions from nodes to nodes can be kept the same as the original GCN variants. To update node embeddings, the embeddings of both node neighbors (the same as the original GCN variants) and edges can be aggregated. To update edge embeddings, the embeddings of both the edge and its associated nodes can be aggregated.

Node embedding alone can fail to capture relevant information corresponding to the edges because node embedding looks at the positions of the nodes in the graph, but ignores the relationships between the nodes captured by the edges.

In various embodiments, the original network graph, G, can be converted into its Line Graph version L(G), such that each node in L(G) represents an edge in G. Two nodes of L(G) are adjacent if and only if their corresponding edges share a common endpoint in G. In various embodiments, DeepWalk can be conducted to learn the node embedding of L(G), which is the edge embedding of G. The node embedding of L(G) can be utilized for the initialization of edge embedding in the original graph G. The DeepWalk method can optimize the node embeddings so that nodes have similar embeddings if they tend to co-occur on short random walks over the graph. Random walk methods employ a flexible, stochastic measure of graph proximity.

The DeepWalk algorithm includes two components; first a random walk generator, and second, an update procedure. The random walk generator can take a graph, G, and samples uniformly a random node $v_i$ as the root of the random walk $Wv_i$. A walk samples uniformly from the neighbors of the last node visited until the maximum length, 1, is reached. Starting from each node, the embedding vectors are then be optimized to encode the statistics of random walks, so that the dot-product, or angle, between two embeddings, $z_i$ and $z_j$, is approximately proportional to the probability of visiting $v_j$ on a fixed-length random walk starting from $v_i$.

DeepWalk and line graph are two different concepts, where DeepWalk is a node embedding method. In contrast, a line graph is a format of a graph, where nodes in the original graph become the edges in the line graph, and edges of the original graph become nodes in the line graph. When edge attributes are unavailable, the original graph can be converted into a line graph. DeepWalk can then be used to learn the node embedding of the line graph, which is the node embedding of the original graph.

A difficulty that is addressed, is how to generate edge embeddings when edge attributes are lacking. Embedding methods that use edge attributes for initialization of embeddings may not handle such situations. In various embodiments, to learn initial edge embeddings, the original graph can be converted into a line graph, and a node embedding method (e.g., DeepWalk) can be applied to learn the node embedding of the line graph, L(G). Through this approach, edge embedding initialization can be obtained for the case where the edge attributes are unavailable.

In various embodiments, a Graph Convolutional Network (GCN) can be used for traffic jam prediction to help improve the level of city management. The traffic jam prediction may be solved by analyzing the road network. In this network, the nodes are road intersections and edges are roads in Graph, G. Modeling attributes from both nodes and edges can help improve the performance of traffic jam prediction, and direct money and road improvements to locations that would provide the most efficient and effective traffic improvements that benefit the community the most. Edge information (attributes) can contain semantically-rich relations among and between nodes. These relations and interactions can be important for traffic jam predictions, where road intersections are nodes and roads are edges. There are many useful attributes that can be leveraged for traffic jam prediction, such as node attributes (e.g., location of the road intersections and surroundings), and edge attributes (e.g., traffic volume, road condition, etc.). For example, in road networks, edge attributes (e.g., traffic volumes, road condition) describe how passengers commute between different locations. The information obtained from analyzing a road graph can be used to predict traffic patterns, minimize traffic times through alerts, and adjust traffic light timing.

However, some edge attributes such as road condition may not be available in real life or in real time for all roads, and the basic GCNs do not consider edge attributes. This can jeopardize the prediction accuracy of the GCN. This can be due to two reasons. First, the road condition is difficult to quantify, and second, the road condition changes over time. It can also be difficult to obtain road conditions for roads that are infrequently travelled. Current GCNs fail to address the scenario above. Therefore, a solution that learns edge embedding (latent features) to model edge attributes when they may be partially missing is presented.

Since node attributes, $x_v$, (e.g., location of road intersections, etc.) and edge attributes, $x_E$, (e.g., road condition, etc.) have different semantic meanings, computations may not be conducted over them directly. In other words, the node feature(s) and the edge feature(s) are not in the same feature space. For the road network, a line graph, L(G), can be generated, where road segments become nodes and road intersections become edges in L(G). The node attributes of G can then be aligned with edge attributes of G in the same semantic space. To learn the model, the interactions among nodes and edges are taken into account, where node embedding and edge embedding can be learned simultaneously. Therefore, three meta-interaction among nodes and edges are defined, including the meta-interaction from nodes to edges, edges to nodes, and nodes to nodes.

In a non-limiting exemplary embodiment, in a road network, traffic can be related to the area surrounding the road intersection, for example, proximity to a shopping mall, parking lot, airport, or bus terminal can cause a measurable increase in traffic volume and traffic jams, particularly at high volume periods during the day. In contrast, intersections in residential neighborhoods with alternative traffic routes may have negligible traffic throughout the day. Such attributes can be captured in the data for the nodes representing such intersections.

The characteristics of the roads leading to such intersections can also have an influence on traffic flow and patterns that is not captured by the intersection itself. Road attributes, for example, traffic volume (e.g., cars/hour), road conditions (e.g., large potholes, no shoulder), hazards (e.g., sharp curves, animal crossing, ice formation), flooding, and number of lanes, as well as combinations thereof, can affect traffic jams and traffic flow. In addition, high volume road segments and intersections can suffer from increased and/or faster road degradation, which can be represented by the road attributes, and require more and/or sooner maintenance.

In various embodiments, during the model learning, the embedding of a node can be updated by considering the effects from both its neighbor nodes and the associated edges. To update the embedding of an edge, the effects from its associated two nodes and the effects of itself can be considered.

For example, on one hand, if the road intersection has a very large traffic volume, the associated roads would be expected to have a relatively large traffic volume as well. On the other hand, if the traffic volume of one road is very large, the associated road intersections should also be expected to have a large traffic volume.

Where node embedding, for example, using GCN, may capture attributes of the intersections, road attributes would be lost because of the lack of edge embedding in such models. GCNs cannot model edge attributes directly. Road conditions also may not be directly concatenated to nodes for GCNs. Additional complexities result from a lack of data for edge attributes, for example, rural road may not be inspected as often as higher volume roads, so current condition data could be lacking. Conditions can also change with time. Difficulties in quantifying certain attributes can also add to the difficulties.

In various embodiments, the GCN is a node embedding method to learn node features for graphs/networks. The GCN can be used to learn the node embedding of road network, where nodes in road network are road intersections. After obtaining the features of road intersections, the features can be used to do any transportation-related tasks, including, for example, traffic jam prediction, accidents prediction, road maintenance prediction, etc.

Figure 1:
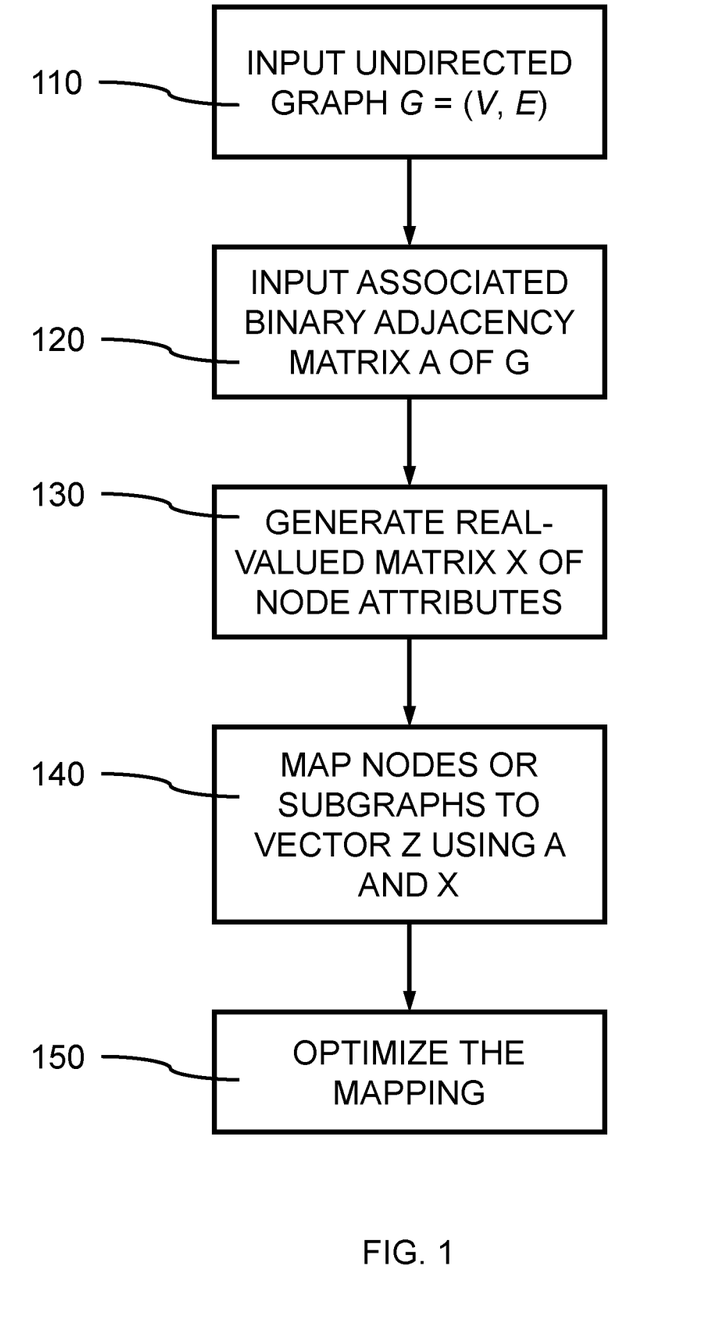
FIG. 1 is a block/flow diagram illustrating a high-level system/method for a node embedding algorithm, in accordance with an embodiment of the present invention.

FIG. 1 is a block/flow diagram illustrating a high-level system/method for a node embedding algorithm, in accordance with an embodiment of the present invention.

Node embedding encodes the nodes from a graph, G, as low-dimensional vectors that summarize the node's graph position and the structure of the node's local graph neighborhood. Similarity in the embedding space reflects the similarity in the graph, G. This can be viewed as encoding, or projecting, the nodes into a latent space, where geometric relations in this latent space correspond to interactions (e.g., edges) in the original graph. There can be two mapping functions: an embedder or encoder, which maps each node to a low-dimensional vector, and a decoder, which decodes structural information about the graph from the learned embeddings.

$$ENC: V \rightarrow z_i \in R^d$$

$$DEC: R^d \times R^d \rightarrow R^+$$

A node embedding or encoding function $f$ is a map $f: V \rightarrow R^d$ that maps each node $v \in V$ to a real-valued feature vector, $z_i$, in $R^d$, where $R^d$ is a real value matrix with dimension, d, where "d" is the size of the feature set (i.e., feature dimension) that describes each node. The range of values for "d" can be positive real values (i.e., >0). Embedding methods have the goal of learning optimal node embeddings for large networks that can later be used in a downstream machine learning task. The mapping function can be given by:

$$f: x_v \rightarrow h_v, x_E \rightarrow h_E.$$

In this formula $f$ is an encoding or mapping function, $x_v$ and $x_E$ denote the attributes of nodes and edges in the original space, respectively, while $h_v$ and $h_E$ denote the attributes of nodes and edges in the mapped space.

In block 110, a graph is inputted into the Graph Convolutional Network (GCN), where the original graph, G, includes vertices (i.e., nodes) and edges connecting the nodes. The graph can be an undirected graph.

In block 120, an associated binary adjacency matrix, A, can be generated from the graph, G. The elements of the matrix, A, can indicate whether pairs of vertices are adjacent or not in the graph.

In block 130, a real valued matrix, X, can be generated for the node attributes (i.e., node features) of graph, G. The elements of real valued matrix, X, consist entirely of real numbers, and the set of real valued matrix can be denoted as $R^d$, where d is the size of the feature set (i.e., feature dimension) that describe each node.

In block 140, the nodes or subgraph(s) of graph, G, can be mapped to a vector, Z, using A and X.

In block 150, the mapping is optimized. This can be accomplished using a loss function.

Figure 2:
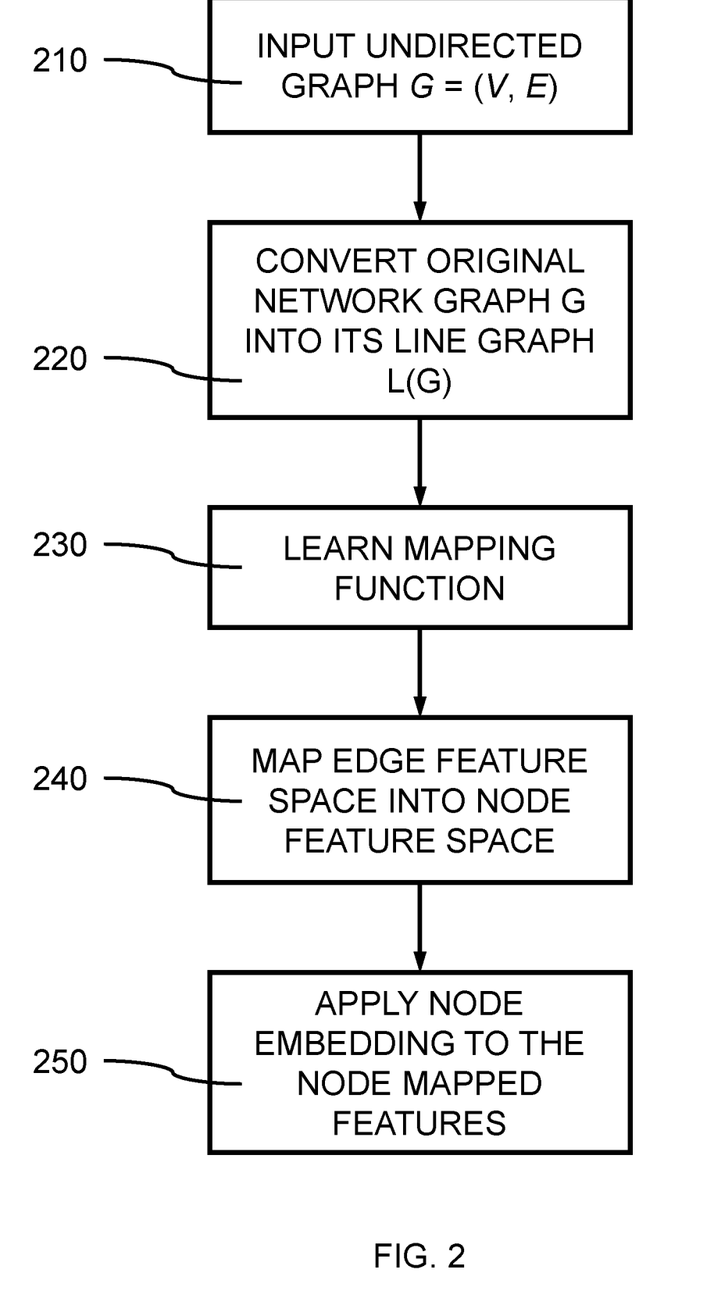
FIG. 2 is a block/flow diagram illustrating a system/method for an edge embedding algorithm, in accordance with an embodiment of the present invention.

FIG. 2 is a block/flow diagram illustrating a system/method for an edge embedding algorithm, in accordance with an embodiment of the present invention.

In block 210, the original graph, G, including nodes and edges is inputted into the graph convolution network (GCN).

In block 220, the original graph, G, is converted into a line graph, L(G). The edges of graph, G, are converted into nodes in L(G). For example, given a triplet <$N_A$, $E_{AB}$, $N_B$>, where $N_A$ is node A, $N_B$ is node B, and $E_{AB}$ is the edge connecting node A to node B, the embedding of $N_A$ ($N_B$) plus the embedding of $E_{AB}$ should be equal to $N_B$ ($N_A$). To accomplish this, a mapping matrix, M is learned to map the edge embedding $E_{AB}$ into the node feature space.

In block 230, the mapping function for mapping the edge features into the node feature space is determined.

The mapping function $\hat{E}$ can include a mapping matrix M, where:

$\hat{E}_{AB} = ME_{AB} + b$, where M is a matrix and b is a bias term. $E_{AB}$ is an interconnecting edge connecting nodes A and B, and $\hat{E}_{AB}$ denotes the mapped edge embedding.

In various embodiments, a loss function can include two parts, (1) the supervised learning loss, and (2) feature space mapping loss, where Ls can denote the supervised learning loss, and the overall training loss L can be represented as:

$$L = \lambda L_s(\text{lossclassification}) + (1-\lambda) \Sigma_{A \in |V|, B \in N(A)} |V_A + \hat{E}_{AB} - V_B|$$

The objective can be to minimize the overall training loss L.

In block 240, the vertices of the line graph, L(G), is embedded into a node space, where the edge features of the graph, G, can be mapped into the same space as the nodes of graph, G.

In various embodiments, the objective is to minimize the mapping loss:

$L_{mapping} = \Sigma_{A \in |V|, B \in N(A)} |V_A + \hat{E}_{AB} - V_B|$, where N(A) denotes the neighbor set of node $N_A$. Nodes and edges can interact with each other in a certain way.

In block 250, the node features of graph, G, edge features from L(G) can be embedded into the same feature space. The node features of graph, G, can, thereby, be embedded into the same node space as the edge features.

Figure 3:
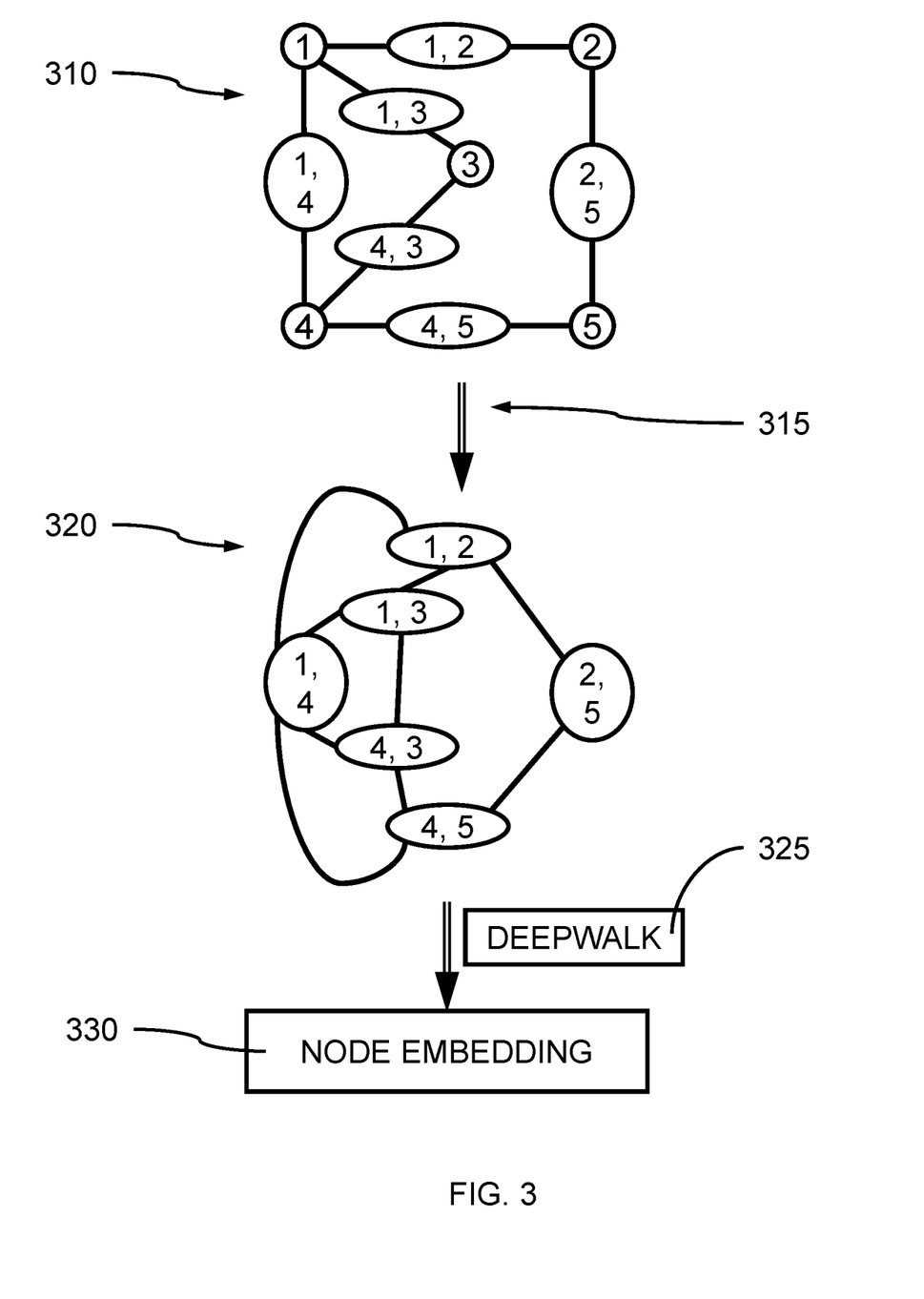
FIG. 3 is a diagram illustrating the transformation of a graph, G, into a line graph, L(G), and the line graph undergoing node embedding, in accordance with an embodiment of the present invention.

FIG. 3 is a diagram illustrating the transformation of a graph, G, into a line graph, L(G), and the line graph undergoing node embedding, in accordance with an embodiment of the present invention.

Node features and edge features are not usually in the same feature space, so the information available from each is usually not compatible or comparable. To use all of the available information from both nodes and edges and do computations, the nodes and edges would be mapped into the same feature space. For example, for a triplet, ($N_a$, $N_b$, $E_{ab}$), there can be a relationship of head+relationship=tail. A mapping matrix, $M_r$, that can map entity space into a relation embedding can be learned. $\hat{E}_{AB} = M_r E_{AB} + b$ This can map edge feature space into node feature space. In the loss function, the mapping loss can be added in as a regularization term:

$$L = \lambda_{lossclassification} + (1-\lambda) \Sigma_{A \in |V|, B \in N(A)} |V_A + \hat{E}_{AB} - V_B|$$

In 310, the nodes connected to opposite ends of an edge are encoded as an associated pair of node identifiers. For example, the edge between nodes 1 and 4 is identified by the pair, (1, 4). This is done for each edge in the graph, G.

In 315, the edges are translated into nodes and the original nodes effectively become edges to form the line graph in 320.

In 320, each associated pair of identifiers is then treated as a node in the line graph, L(G), such that each vertex of L(G) represents an edge of G. As shown, the original edge between original nodes 1 and 3 become a node connected with three edges, which were originally the two paths connected with node 1, and the single path with node 3.

In 325, a random walk method is applied to each of the vertexes in L(G), for example, DeepWalk, to learn the node embedding of the line graph.

In 330, the vertices of L(G) are embedded as nodes with the original nodes of graph, G. This places the original nodes and original edges into the same feature space.

Figure 4:
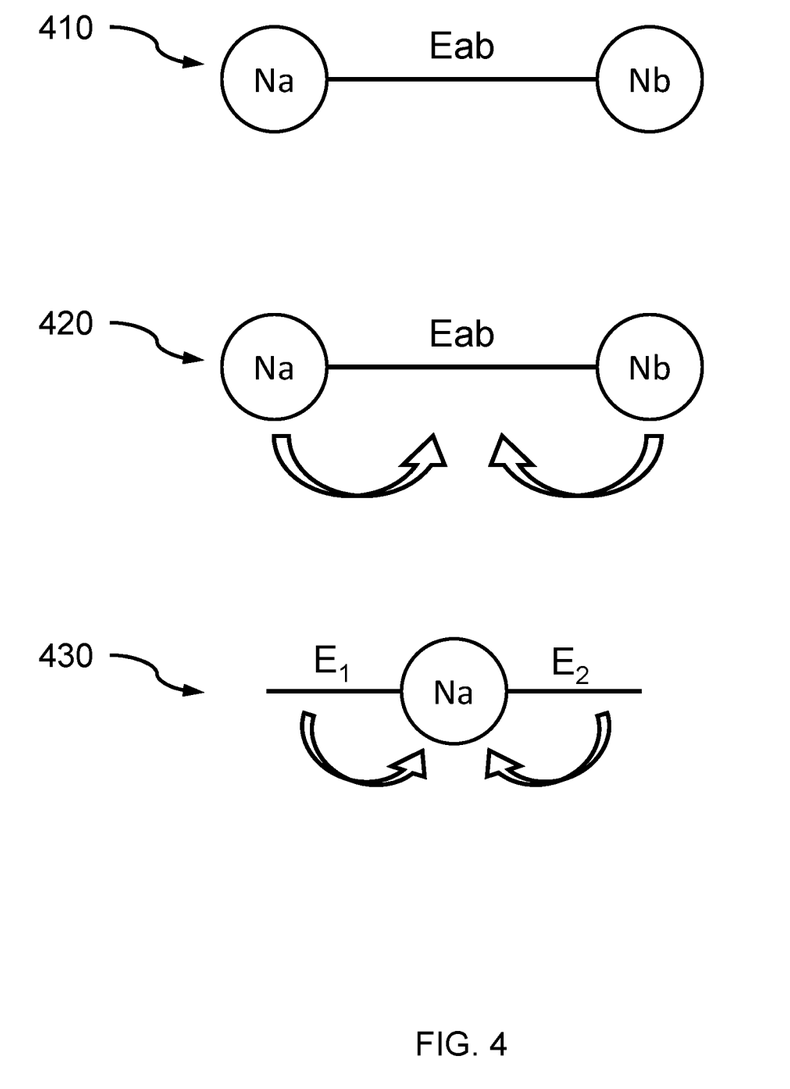
FIG. 4 is a set of diagrams illustrating the edge and node relationships in graph, G, and the meta-interactions being modeled, in accordance with an embodiment of the present invention.

FIG. 4 is a set of diagrams illustrating the edge and node relationships in graph, G, and the meta-interactions being modeled, in accordance with an embodiment of the present invention.

In various embodiments, there are three meta-interactions between the nodes and edges.

In 410, two nodes, Na and Nb, and the interconnecting edge, Eab, form the triplet, ($N_a$, $N_b$, $E_{ab}$).

In 420, to model the meta-interactions from nodes to edges, the relationship is given by:

$F_1(V,E) = \tanh(W_1[V,E]+b_1)$. $F_1$ is a function that denotes the interactions from nodes to edges, where V is the node set, E is the edge set, $W_1$ is a first weight term, and the $b_1$ is a first bias term.

In 430, to model the meta-interactions from edges to nodes, the relationship is given by:

$F_2(V,E) = \tanh(W_2[V,E]+b_2)$. $F_2$ is a function that denotes the interactions from edges to nodes, where V is the node set, E is the edge set, $W_2$ is a second weight term, and the $b_2$ is a second bias term.

To model the meta-interactions from nodes to nodes:

$F_3(V, V)$ This uses node embedding without edges.

In various embodiments, the updating scheme includes two parts, (1) updating the node embedding, and (2) updating the edge embedding. A framework can incorporate edge embedding by preserving all of the meta-interactions.

For (1) updating node embedding, the new node embedding includes two parts, where one part is the updating results from original GCNs, another part is effects from edges via the meta-interactions from edges to nodes.

$$V_A^{l+1} = f(V_A, V_{B \in N(A)}) + W_v \Sigma_{B \in N(A)} F_2(\hat{E}_{AB}^l, V_A) \odot \hat{E}_{AB}^l$$

For (2) updating edge embedding, the new edge embedding includes two parts, where one part is the effects from two endpoints via the meta-interaction from nodes to edges, another part is the older edge embedding.

$\hat{E}_{AB}^{l+1} = \sigma(W_E[F_1(V_A^l, E_{AB}^l) \odot V_A^l, (V_B^l, E_{AB}^l) \odot V_B^l, \hat{E}_{AB}^l] + b_v$; where $[F_1(V_A^l, E_{AB}^l) \odot V_A^l, (V_B^l, E_{AB}^l) \odot V_B^l, \hat{E}_{AB}^l]$ provides the effects of two nodes on the edge. $\hat{E}_{AB}^l$ provides the effect of the edge, itself.

Embedding over a line graph can preserve information of the edges. Node embedding and edge embedding can enhance each other. The proposed flexible edge empowered GCN framework can be effective for modeling such systems with nodes and edges.

In various embodiments, nodes can represent entities (e.g., persons, places, things, etc.) and edges can represent different relations (e.g, ownership, family relations, physical proximity, particular properties or characteristics, etc.) between or relating to the entities. Node embedding with edge embedding can provide better modeling and improved relationship quantification and/or prediction.

Figure 5:
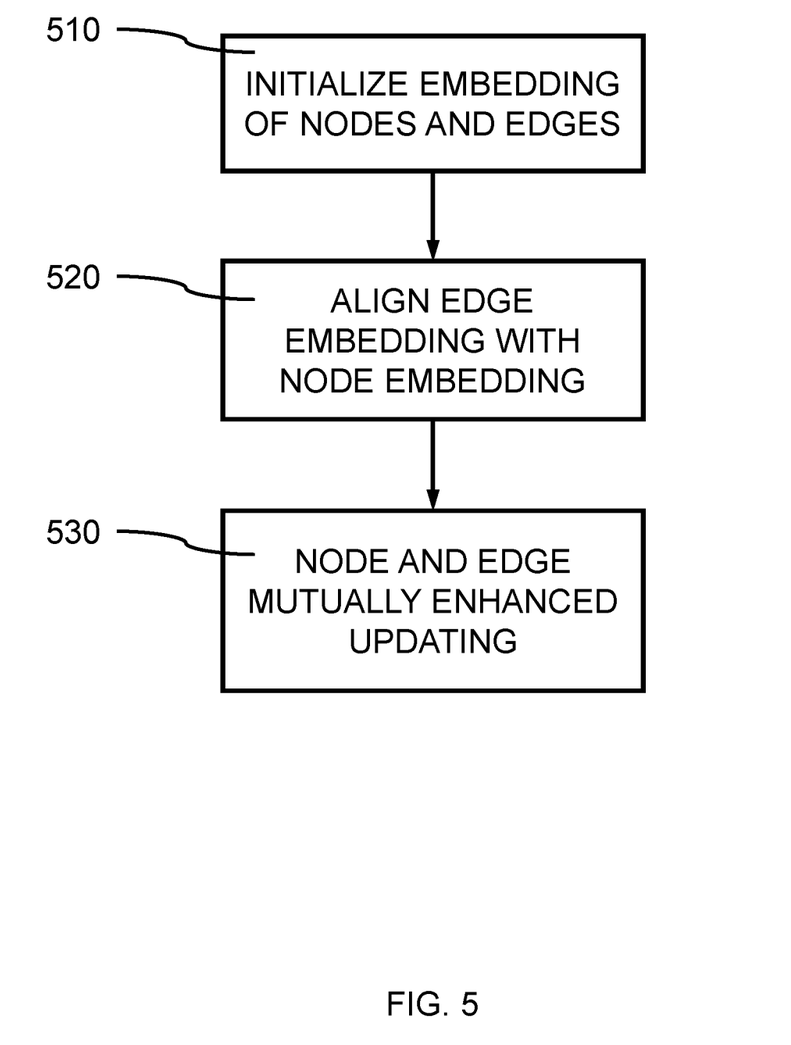
FIG. 5 is a block/flow diagram illustrating a high-level system/method for an edge-empowered graph convolutional network (EE-GCN), in accordance with an embodiment of the present invention.

FIG. 5 is a block/flow diagram illustrating a high-level system/method for an edge-empowered graph convolutional network (EE-GCN), in accordance with an embodiment of the present invention.

In block 510, an initialization of the node and edge embedding is conducted. In various embodiments, the learned features need to be learned from scratch at a starting point. Such a starting point is referred to as an initialization. In various embodiments, the initialization of embeddings can be an essential step of GCNs. The embeddings of both nodes and edges can be initialized, where edge embeddings can be initialized by converting the original graph into the line graph, L(G), where the edges in the original graph become nodes in the line graph, and nodes become edges in the line graph. Node embeddings can be initialized in the manner used for GCNs.

For Graphs with partially available edge attributes, line graph initialization allows the edge embedding initialization method to be considered as a pre-trained model. The line graph can preserve the essential properties of edges from the original graph. Therefore, the proposed line graph-based method provides a reasonable edge embedding initialization after pre-training a node embedding model over the corresponding line graph.

In block 520, the node feature space and edge feature space are aligned. This is under the translation assumption that given a pair of nodes and their corresponding edge, the embedding of one node adds the embedding of the edge, resulting in the embedding of the other node. In various embodiments, a mapping matrix that maps the entity embedding into the relation space is learned, with the mapping assumption that the mapped head embedding plus the relation embedding should be equal to the tail embedding.

This assumption can serve as a regularization term in a loss function in order to align the edge embedding space with the node embedding space. Node and edge embeddings can affect each other through mutual interactions. For example, given a triplet of one edge and the two endpoints $<v, E_{vv'}, v'>$ the embedding of v(v') plus the embedding of $E_{AB}$ should be equal to that of v'(v). To achieve this, a mapping matrix M is learned that maps the edge embedding $h_{E_{vv'}}$ into the node feature space.

$\hat{h}_{E_{vv'}} = Mh_{E_{vv'}} + b_M$, where $h_{E_{vv'}}$ is the original edge embedding, $\hat{h}_{E_{vv'}}$ is the mapped edge embedding, and $b_M$ is a bias term.

$L = L_{mapping} = \Sigma_{v \in V, v' \in N(v)} |h_v + \hat{h}_{E_{vv'}} - h_{v'}|$, where $N(v)$ denotes the neighbor set of node v.

Then, the aligned node and edge embedding can be fed into the updating step to learn mutually enhanced embeddings. Node updating is given by:

$$h_v^{l+1} = f(h_v^l, h_{v' \in N(v)}^l) + W_v \Sigma F_2(\hat{h}_{E_{vv'}}, V_A^l) \odot \hat{h}_{E_{vv'}}$$

This formula shows the node embedding updating rule for various embodiments that include two parts: effects from neighboring nodes and effects from the associated edges. In this formula, $h_{(\cdot)}^l$ represents the embeddings at the $l^{th}$ hidden layer, $h_{(\cdot)}^{l+1}$ represents the embeddings at the $l+1^{th}$ hidden layer, v' one neighboring node of the node v, $v' \in N(v)$, $\hat{h}_{E_{vv'}}$ denotes the aligned embedding (mapped from edge feature space into node feature space) of the edge $E_{vv'}$ at the $i^{th}$ hidden layer, $W_v$ the weights of the model, $F_2(\cdot)$ the meta-interactions, and $V_A^l$ a the node embeddings at the $l^{th}$ hidden layer. To capture the effects from neighboring nodes, the output of the original updating rules of GCNs can be adopted. Since the interaction from the edges to nodes depicts how much the associated edges can affect the node, to capture the effects from associated edges, the Hadamard product, $\odot$, between the edge embedding and the interactions from edges to nodes is calculated. Then, the effects from both neighboring nodes and associated edges are summed up as the new node embedding.

Formally, let Ws denote the weights, bs denote the biases, and the superscript "l" denote the corresponding embedding in the $l^{th}$ hidden layer.

Adding the effects from nodes and edge embedding as the new edge embedding is given by:

$$\hat{h}_{E_{vv'}}^{l+1} = \sigma(W_E[F_1(h_v^l, \hat{h}_{E_{vv'}}^l) \odot h_{v'}^l, F_1(h_{v'}^l, \hat{h}_{E_{vv'}}^l) \odot h_v^l, \hat{h}_{E_{vv'}}^l] + b_e$$

This formula shows the edge embedding updating rule in various embodiments that includes two parts: effects from the two endpoints and effects from the edge itself. To capture the effects from the endpoints, the Hadamard product between the node embedding and the interactions from nodes to edges is calculated. Then, the effects from both nodes and the edge itself can be summed up as the new edge embedding. In this formula, $h_{(\cdot)}^l$ represents the embeddings at the $l^{th}$ hidden layer, $W_E$ is the weights of the model, $F_1(\bullet)$ is the meta-interactions, and $b_e$ is the bias.

In various embodiments, a mapping matrix that maps the entity embedding into the relation space is learned, with the mapping assumption that the mapped head embedding plus the relation embedding should be equal to the tail embedding.

In block 530, the node and edge embeddings are updated for mutual enhancement. This can be accomplished using the three types of meta interactions.

After aligning the node-edge feature space, node and edge embeddings are still difficult to be jointly modeled, due to the complex interactions between nodes and edges. A classical GCN learns the node embedding by aggregating its neighbors' embedding, where the interactions between nodes are considered as the linear relation. However, when the edge embedding is taken into account, the interactions become more complicated. This is due to the different types of interactions that can be categorized into: (i) interactions from nodes to edges, (ii) interactions from edges to nodes, and (iii) interactions from nodes to nodes.

To address this challenge, these three types of meta-interactions are first described. Then, a framework to incorporate edge embedding by preserving each of the meta-interactions is presented. The interactions among nodes and edges can be investigated from two perspectives, i.e. direction and quantity.

In various embodiments, the interactions from nodes to nodes can be defined by the original GCNs. For example, in GraphSAGE, the ADD aggregator defines the interactions from nodes to nodes as the summation, while the MEAN aggregator defines the interactions from nodes to nodes as the mean of embeddings. To capture the effects from associated edges, the Hadamard product can be calculated between the edge embedding and the interactions from edges to nodes. Then, the effects from both neighboring nodes and associated edges can be summed as the new node embedding. To capture the effects from the endpoints, the Hadamard product can be calculated between the node embedding and the interactions from nodes to edges. Then, the effects from both nodes and the edge itself can be summed as the new edge embedding. Interactions between entities (nodes) and relationships (edges) can, thereby, enhance each other.

To adapt our framework into any supervised learning pipeline, such as node classification, link prediction, and graph classification, etc., we model the training procedure as an optimization problem by minimizing the cost associated with the learning. The loss function can include two parts: (1) supervised learning loss, and (2) feature space mapping loss. The objective is to minimize the overall training loss L, and $\lambda$ is the weight to control the contribution of feature mapping loss to the total loss.

Figure 6:
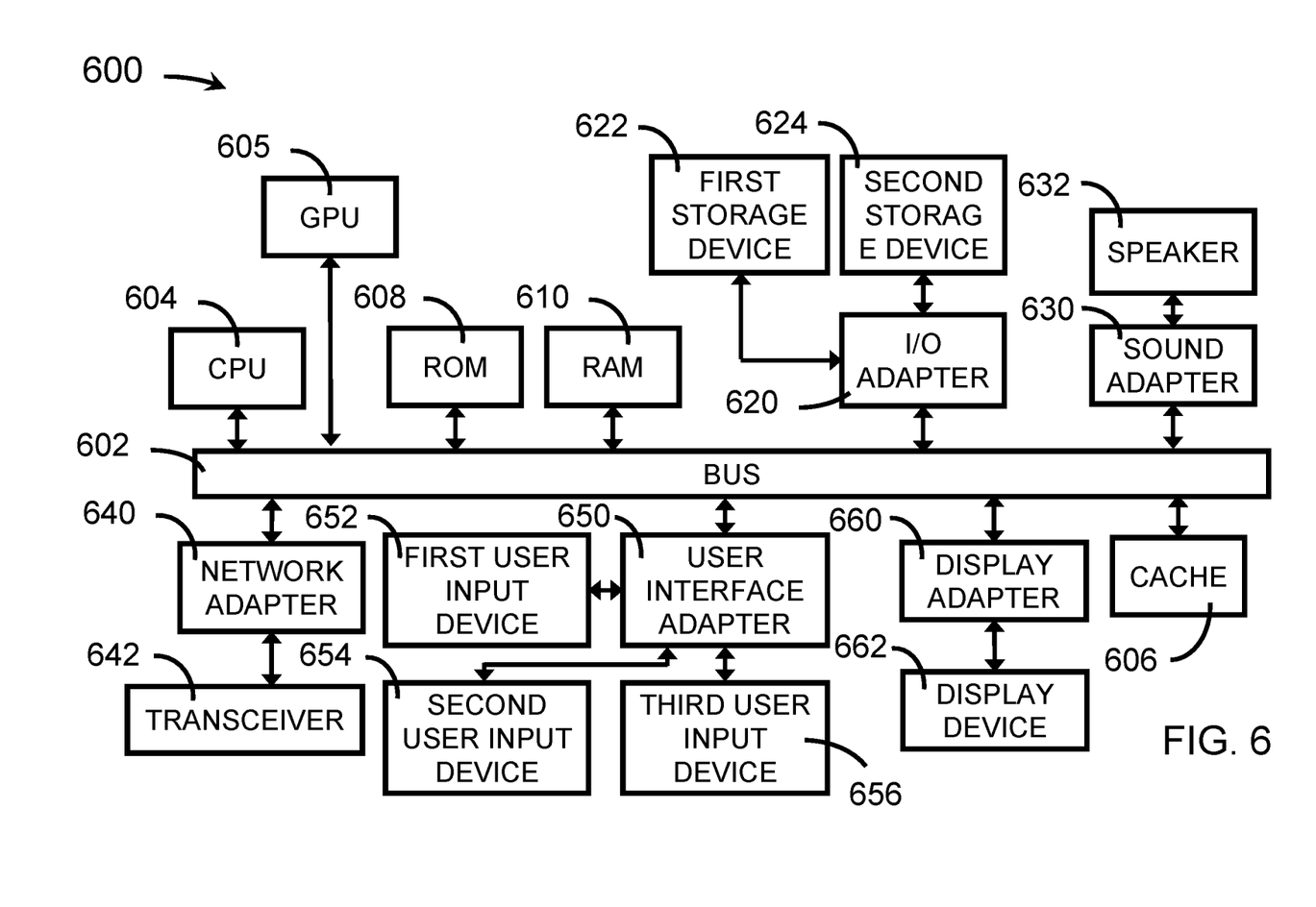
FIG. 6 is an exemplary processing system 600 to which the present methods and systems may be applied, in accordance with an embodiment of the present invention.

FIG. 6 is an exemplary processing system 600 to which the present methods and systems may be applied, in accordance with an embodiment of the present invention.

The processing system 600 can include at least one processor (CPU) 604 and at least one graphics processing (GPU) 605 that can perform vector calculations/manipulations operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 354, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a system for implementing respective embodiments of the present methods/systems. Part or all of processing system 600 may be implemented in one or more of the elements of FIGS. 1-5. Further, it is to be appreciated that processing system 600 may perform at least part of the methods described herein including, for example, at least part of the method of FIGS. 1-5.

Figure 7:
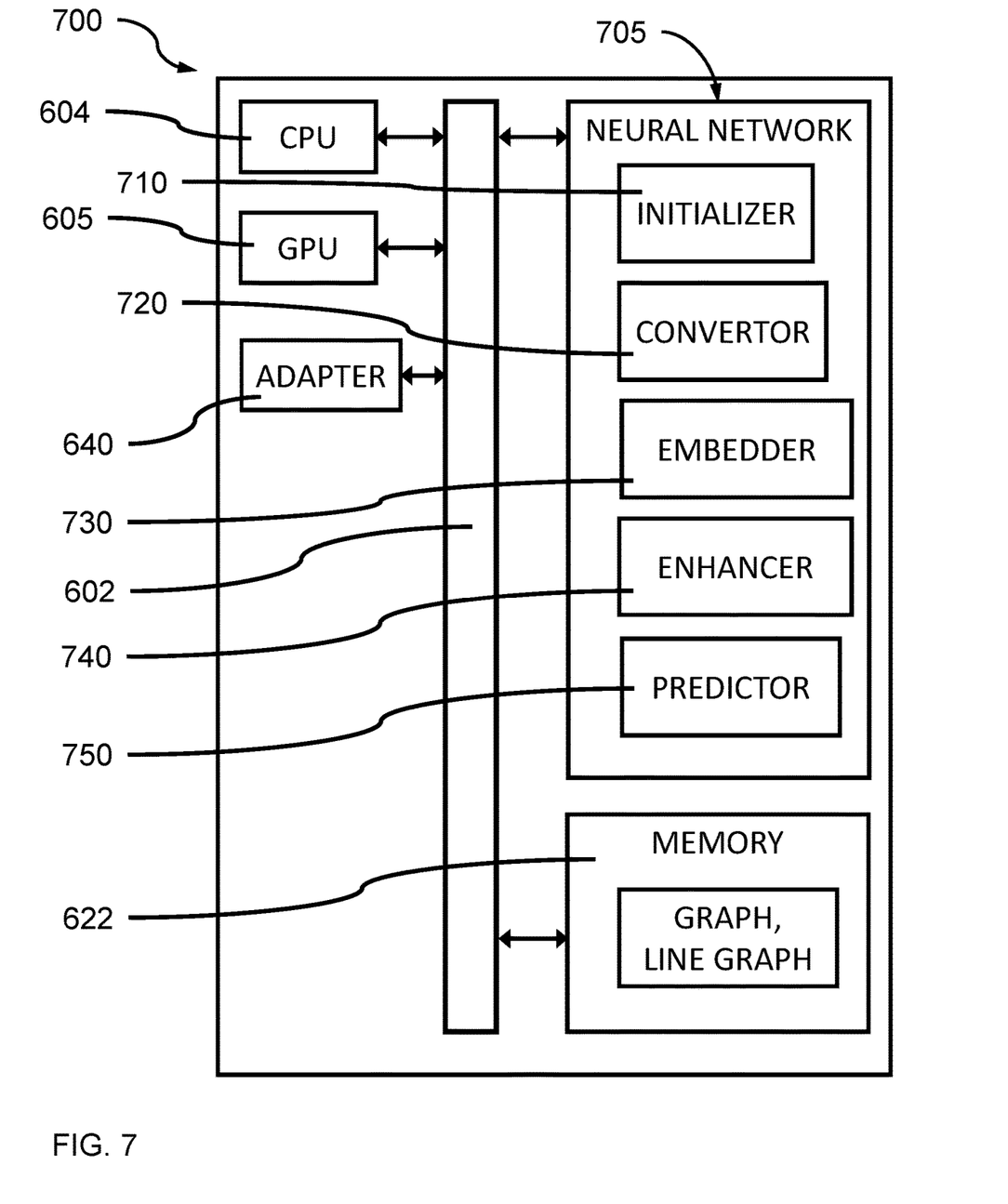
FIG. 7 is an exemplary processing system configured to implement a provenance-based threat detection tool, in accordance with an embodiment of the present invention.

FIG. 7 is an exemplary processing system configured to implement a provenance-based threat detection tool, in accordance with an embodiment of the present invention.

In one or more embodiments, the processing system 700 can be a computer system 600 implementing a neural network 705 to perform a computer implemented method of predicting traffic flow and road conditions.

In various embodiments, the neural network 705 can include an Intitializer 710 that can be configured to initialize node embeddings.

In various embodiments, the neural network 705 can include a convertor 720 configured to convert a graph, G, to a line graph, L(G), where the convertor can be configured to translate the edges of the graph, G, into nodes of a line graph, L(G).

In various embodiments, the neural network 705 can include an embedder 730 configured to embed the nodes of a graph, G, and/or embed the nodes of a line graph, L(G), into a feature space.

In various embodiments, the neural network 705 can include an enhancer 740 configured to update the node embedding from the graph, G, and line graph, L(G). The enhancer can be configured to align the nodes from the line graph with the node from the graph using a learned mapping matrix. The enhancer 740 can also be configured to optimize the alignment by utilizing a regularization term in a final loss function. The enhancer 740 can be configured to use a DeepWalk method to optimize the node embeddings. The enhancer 740 can also be configured to update the edge embeddings and node embedding by modeling meta-interactions between the nodes and edges of the graph.

In various embodiments, the neural network 705 can include a predictor 750 configured to predict traffic flow patterns and traffic volume from the graph, G, and line graph, L(G). The predictor 750 can be configured to output a set of node and edge representations that predicts the traffic flow for each of the road segments and road intersections of the graph based on the optimized alignment of the nodes from the line graph with the nodes from the graph.

Figure 8:
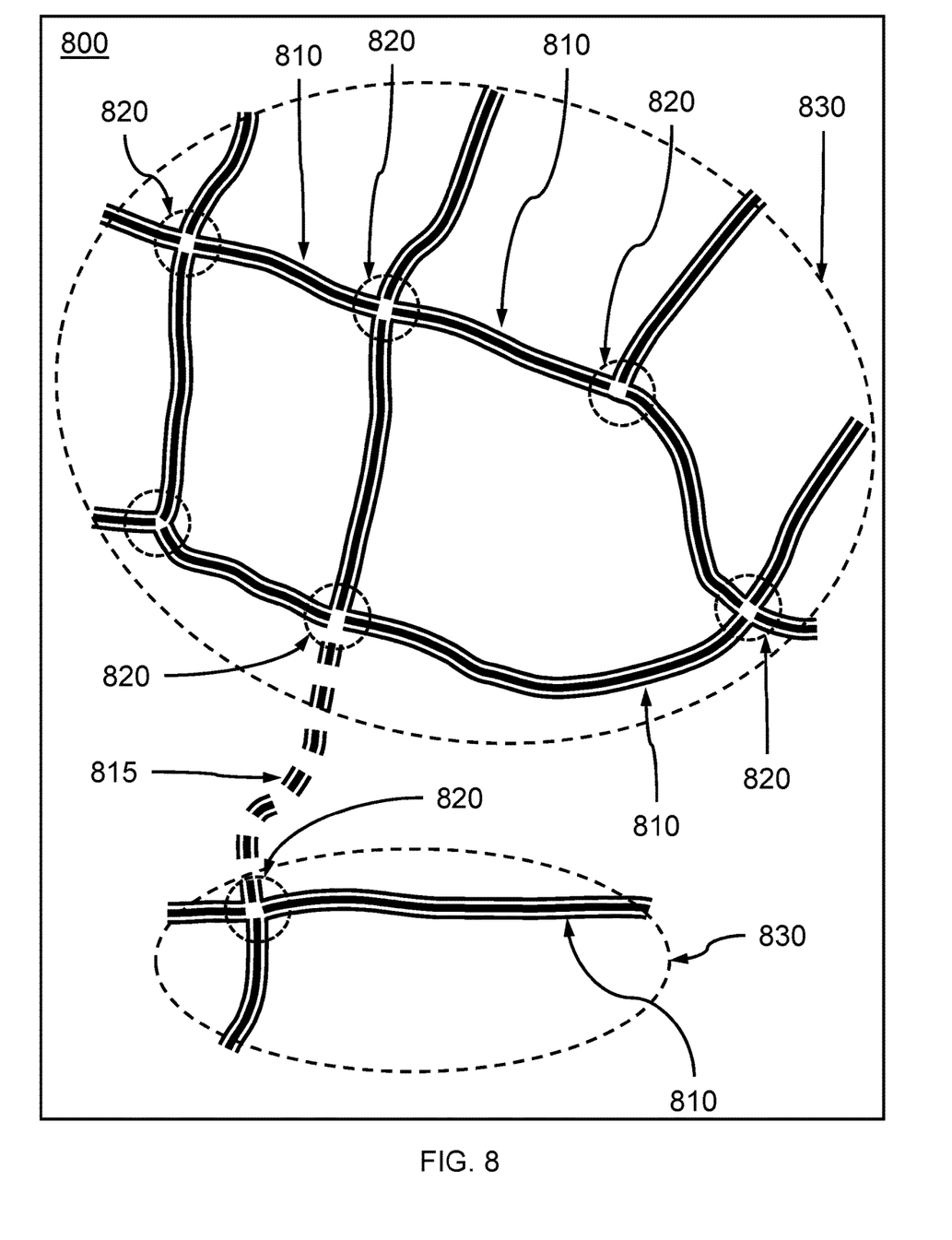
FIG. 8 is a diagram of a display of a road network with intersections that can be analyzed using an EE-GCN, in accordance with an embodiment of the present invention.

FIG. 8 is a diagram of a display of a road network with intersections that can be analyzed using an EE-GCN, in accordance with an embodiment of the present invention.

There can be multiple road segments 810 and multiple road intersections 820 formed by the meeting of two or more road segments 810. A single road segment 815 may be a high volume road because it is the only road segment connecting two separate road regions 830.

In various embodiments, the EE-GCN can model the road network and predict traffic flows on the road segments 810 between the road intersections 820, including the high-volume road segment 815. Road attributes can be included for none, some, or all of the road segments 810, 815, and for none, some, or all of the intersections 820.

In one or more embodiments, the road intersections 820 can be considered nodes having node attributes, and road segments 810, 815 can be considered edges with edge attributes in a graph, G. The nodes of graph, G, can be embedded into a node spacer. The edges of graph, G, can be translated into nodes of a line graph, L(G), and the nodes of the line graph, L(G), can be embedded into the node space. The nodes from graph, G, and the nodes from line graph, L(G), can then be aligned. The EE-GCN can then predict traffic conditions for graph, G.

In various embodiments, the analysis of the road conditions and predicted traffic conditions can be presented to a user, for example, on a screen 800 of a display device 662, such that the user can make real time decisions regarding traffic congestions. In various embodiments, a processing system 700 can provide instructions to a user to change a driving route to avoid traffic volume and congestion based on the predict traffic conditions, for example, while the user is driving in a motor vehicle.

In various embodiments, the analysis of the road conditions and predicted traffic conditions can be presented to a user, for example, on a screen 800 of a display device 662, such that the user, for example, a city manager or department of transportation official, can make decisions regarding directing work crews and/or finances to identified regions of a road network for repairs and/or upgrades to relieve traffic congestion. In various embodiments, a processing system 700 can provide instructions to the user to repair portions of the road to alleviate traffic volume and congestion based on the predict traffic conditions and/or road attributes to improve traffic management and repair the roads.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for predicting road conditions and traffic volume, comprising:
generating a graph of one or more road regions, wherein each road region includes a plurality of road intersections and a plurality of road segments, and wherein the road intersections are represented as nodes in the graph and the road segments are represented as edges in the graph;
embedding the nodes from the graph into a node space;
translating the edges of the graph into nodes of a line graph;
embedding the nodes of the line graph into the node space;
aligning the nodes from the line graph with the nodes from the graph using a learned mapping matrix;
optimizing the alignment by utilizing a regularization term in a final loss function; and
outputting a set of node and edge representations that predicts the traffic flow for each of the road segments and road intersections of the graph based on the optimized alignment of the nodes from the line graph with the nodes from the graph.

2. The computer implemented method of claim 1, further comprising directing road improvements for the road segments and road intersections predicted to have the greatest traffic flows.

3. The computer implemented method of claim 1, further comprising updating the edge embeddings and node embedding by modeling meta-interactions between the nodes and edges of the graph.

4. The computer implemented method of claim 3, wherein the meta-interactions include node-to-edge interactions, edge-to-node interactions, and node-to-node interactions.

5. The computer implemented method of claim 1, wherein the graph is an attributed graphs represented as $G=(V, E, X_V, X_E)$, where V denotes the set of nodes, E denotes the set of edges, $X_V$ denotes the set of node attributes, and $X_E$ denotes the set of edge attributes.

6. The computer implemented method of claim 5, wherein the edge attributes are only partially available.

7. The computer implemented method of claim 6, wherein the edge attributes are selected from the group consisting of traffic volume, road conditions, hazards, flooding, number of lanes, and combinations thereof.

8. A non-transitory computer readable storage medium comprising a computer readable program for predicting road conditions and traffic volume, wherein the computer readable program when executed on a computer causes the computer to perform the steps of:
generating a graph of one or more road regions, wherein each road region includes a plurality of road intersections and a plurality of road segments, and wherein the road intersections are represented as nodes in the graph and the road segments are represented as edges in the graph;
embedding the nodes from the graph into a node space;
translating the edges of the graph into nodes of a line graph;
embedding the nodes of the line graph into the node space;
aligning the nodes from the line graph with the nodes from the graph using a learned mapping matrix;
optimizing the alignment by utilizing a regularization term in a final loss function; and
outputting a set of node and edge representations that predicts the traffic flow for each of the road segments and road intersections of the graph based on the optimized alignment of the nodes from the line graph with the nodes from the graph.

9. The computer readable program as recited in claim 8, further comprising directing road improvements for the road segments and road intersections predicted to have the greatest traffic flows.

10. The computer readable program as recited in claim 8, further comprising updating the edge embeddings and node embedding by modeling meta-interactions between the nodes and edges of the graph.

11. The computer readable program as recited in claim 10, wherein the meta-interactions include node-to-edge interactions, edge-to-node interactions, and node-to-node interactions.

12. The computer readable program as recited in claim 8, wherein the graph is an attributed graphs represented as $G=(V, E, X_v, X_E)$, where V denotes the set of nodes, E denotes the set of edges, $X_v$ denotes the set of node attributes, and $X_E$ denotes the set of edge attributes.

13. The computer readable program as recited in claim 12, wherein the edge attributes are only partially available.

14. The computer readable program as recited in claim 13, wherein the edge attributes are selected from the group consisting of traffic volume, road conditions, hazards, flooding, number of lanes, and combinations thereof.

15. A system for predicting road conditions and traffic volume, comprising:
a computer system including:
memory configured to store a graph of one or more road regions and program code, wherein each road region includes a plurality of road intersections and a plurality of road segments, and wherein the road intersections are represented as nodes in the graph and the road segments are represented as edged in the graph;
one or more processor devices operatively coupled to the memory for running the program code to:
translate the edges of the graph into nodes of a line graph;
embed the nodes from the graph into a node space and embed the nodes of the line graph into the node space;
to align the nodes from the line graph with the nodes from the graph using a learned mapping matrix, and optimize the alignment by utilizing a regularization term in a final loss function; and
output a set of node and edge representations that predicts the traffic flow for each of the road segments and road intersections of the graph based on the optimized alignment of the nodes from the line graph with the nodes from the graph.

16. The system as recited in claim 15, wherein the one or more processor devices further run the program code to direct road improvements for the road segments and road intersections predicted to have the greatest traffic flows.

17. The system as recited in claim 15, wherein the one or more processor devices further run program code to update the edge embeddings and node embedding by modeling meta-interactions between the nodes and edges of the graph.

18. The system as recited in claim 17, wherein the meta-interactions include node-to-edge interactions, edge-to-node interactions, and node-to-node interactions.

19. The system as recited in claim 15, wherein the graph is an attributed graphs represented as $G=(V, E, X_v, X_E)$, where V denotes the set of nodes, E denotes the set of edges, $X_v$ denotes the set of node attributes, and $X_E$ denotes the set of edge attributes.

20. The system as recited in claim 19, wherein the edge attributes are only partially available.

\* \* \* \* \*